United States Patent [19]

Smith-Johannsen

[11] Patent Number: 4,569,920
[45] Date of Patent: Feb. 11, 1986

[54] PREPARATION OF INORGANIC PARTICLE SLURRIES

[75] Inventor: Robert Smith-Johannsen, Incline Village, Nev.

[73] Assignee: Blasch Precision Ceramics, Inc., Schenectady, N.Y.

[21] Appl. No.: 529,729

[22] Filed: Sep. 6, 1983

[51] Int. Cl.[4] .................. C04B 33/28; C04B 35/00; C04B 35/10

[52] U.S. Cl. ........................ 501/1; 106/38.9; 106/DIG. 3; 264/28; 264/86; 264/176 R; 501/94; 501/99; 501/103; 501/120; 501/127; 501/128; 501/133; 501/141; 501/153; 501/154

[58] Field of Search ............ 264/28, 86, 176 R; 501/1, 133, 128, 94, 99, 103, 120, 127, 141, 153, 154; 106/38.9, DIG. 3

[56] References Cited

U.S. PATENT DOCUMENTS

| | | | |
|---|---|---|---|
| 3,007,878 | 11/1961 | Alexander et al. | 501/133 |
| 3,177,161 | 4/1965 | Smith-Johannsen | 264/28 |
| 3,455,718 | 7/1969 | Dithmar et al. | 252/313.2 |
| 3,758,317 | 9/1973 | Moore et al. | 501/128 |
| 3,860,476 | 1/1975 | Moore | 106/38.3 |
| 4,117,498 | 9/1978 | Edwards et al. | 427/48 |
| 4,246,209 | 1/1981 | Smith-Johannsen | 264/28 |
| 4,301,020 | 11/1981 | Johnson et al. | 501/1 |
| 4,333,961 | 6/1982 | Bruce et al. | 427/48 |
| 4,428,895 | 1/1984 | Blasch et al. | 264/28 |
| 4,482,381 | 11/1984 | Spitz et al. | 106/314 |

Primary Examiner—Helen M. McCarthy
Attorney, Agent, or Firm—Peter F. Casella

[57] ABSTRACT

Novel aqueous inorganic particle slurries, wherein some of the particles have had their charge potential altered to a sufficient extent to prevent segregation or settling of the particles, are described, along with a method for their preparation. The method of forming slurries of negatively charged particles comprises treating some of the particles with a cationic agent to reduce their charge and mixing these treated particles with the remainder of the particles to form a thick, cream-like flowable composition of a thixotropic nature. When slurries of positively charged particles are to be formed, an anionic agent is used instead of a cationic agent.

20 Claims, No Drawings

PREPARATION OF INORGANIC PARTICLE SLURRIES

TECHNICAL FIELD

The invention relates to the preparation of inorganic particle slurries, such as alumina slurries, to prevent particle settling and segregation and to improve the flow and handling properties of the slurry.

BACKGROUND OF THE INVENTION

In order to produce ceramic and refractory bodies, ceramic particles of various sizes are mixed together to obtain a particle size distribution within the mix which will produce the desired density, porosity, and uniformity in the fired product. When these particles are mixed with water, for example, for slip casting or extrusion, the different sizes segregate or settle thus disrupting the particle size distribution and altering the desired density, porosity, and uniformity of the fired end product. This segregation or settling occurs when the slurries are standing before being fired or frozen according to the particular process being used. This settling or segregation of the particles is even more pronounced when the slurry is subjected to a vacuum or vibration operation to remove any entrained air introduced into the slurry during the mixing operation.

In slip casting, the particles are generally mixed with about 10 weight percent water together with a binder, such as feldspar or kaolin clay, in order to impart a green strength to the ceramic before firing. The slurry is then placed in a porous mold which absorbs most of the water contained in the slurry. This removal of water generally imparts a sufficient green strength to the resultant ceramic so that it can be subsequently fired. During this process, the coarse and fine particles segregate or settle to various extents, thus interfering with the uniformity of the resulting fired product.

This particle segregation or settling is even more pronounced in the freeze-cast process where the ceramic particles are intermixed with a colloidal silica sol to form slurries containing approximately 10 weight percent water. In this freeze-cast process, the slurry is introduced into a solid mold which is generally metallic, so that no water is removed from the slurry as would be from the porous molds which are used in the slip-casting process. If these slurries are allowed to stand for too long a period of time before being frozen, the particles segregate or settle and the slurry becomes watery. At times, the particles can settle to the extent that a layer of water can be observed on the top of the ceramic particles contained in the mold. This segregation or settling of particles can also occur during the operation where the temperature of the slurry is lowered to near freezing and/or while supercooling the slurry before it is frozen, since reducing the temperature of the entire slurry, particularly if large ceramic articles are to be produced, can be somewhat time consuming.

In addition, in both the conventional and freeze-cast techniques, the green strength of the casting is reduced by this particle segregation or settling.

The flow properties of the slurry are also affected by this particle segregation to the extent that, at least in part, it affects the manner in which the slurry is handled, such as by extrusion into molds.

SUMMARY OF THE INVENTION

This invention relates to the treatment of ceramic particles during the preparation of a particle slurry with a cationic agent which prevents segregation of the coarse particles from the fine particles and yet permits good fluid flow and pumpability.

The invention is applicable to the mixing of slurries for producing fired ceramic bodies by conventional processes, but is particularly applicable to the mixing of slurries utilizing the so called freeze-cast process, such as disclosed in U.S. Pat. Nos. 3,177,161; 3,512,571; 3,861,572; 3,885,005; and 4,246,209.

One of the objects of this invention is to mix the various size particles together in water and to maintain these particles in a fixed position during subsequent handling of the slurry before firing, such as during air removal or extrusion operations or while standing, and also to impart a good green strength to the molded or frozen and thawed structures before firing. The better the green strength of the ceramic article, the better the strength of the final, fired ceramic article.

Cationic agents that can be used according to the invention include polyethyleneimines, such as Corcat P-12 marketed by Cordova Chemical Co., or those which are available from the Dow Chemical Company, polyvinyl benzo trimethyl ammonium chloride marketed under the name ECR-34, dicyanodiamine-formaldehyde condensates (hydrochloride) marketed by the Sun Chemical Corporation under the names Warcofix or Sunpro. Cationic colloidal silica, such as that marketed by Dupont under the name positive Sol, can also be used. Since the object is to reduce the charge on part of the particles employed to form the particle slurries, practically any cationic agent could be used as long as it does not in some way adversely affect the fixed position of the particles or the flow properties of the slurry. One adverse effect to be avoided includes a chemical reaction between the cationic agent and the particles, an impurity, or a stabilizing agent. All cationic agents do not act the same—some seem to work better than others—but to date, polyethyleneimines have been found to be most advantageous.

In practicing the invention only a portion of the particles used to make up the particle mix are treated with a cationic agent. The charges (zeta potential) on inorganic particles are negative and thus the treatment with a cationic agent reduces their charge. Furthermore, since only a portion of the particles are so treated, a mixture of particles having different charges results. The amount of cationic agent employed will, of course, depend a great deal on the amount of particles which are treated. On a set number of particles, the amount of cationic agent used should be insufficient to reverse the charge on the particles, but sufficient to reduce the charge on the portion of the particles treated so that when the treated particles are mixed with the untreated particles, a composition of creamy consistency is formed. The amount of cationic agent used and the amount of particles to be treated can thus be empirically determined for each refractory or mixture thereof by routine experimentation. The reduction of charge on the particles could be determined by measuring the zeta potentials and zeta potential range for each set of conditions, but this is not necessary since the condition of treatment of part of the particles can be much more easily determined empirically. Too much cationic agent will cause the composition to set, while too little will not produce the proper cream-like consistency.

When using the freeze-cast process, it is advantageous to treat the colloidal sol particles to reduce their charge as set forth in Example 1.

The various inorganic particles that can be used according to this invention include, but are not limited to, aluminas such as mullite and tabular alumina, silicas such as fused silica, magnesia, chromite, spinels such as chromite spinel, kyanite, carbomul, zirconia, mica, carbon, graphite, molybdenum disulfide, uranium oxide, thoria, titania, and clays. The invention, however, is broadly applicable to suspensions of inorganic particles in general, including other metal compounds in addition to the above-mentioned oxides. Mixtures of any of these materials may also be used, if desired.

As previously mentioned, particle size distribution and packing are important to control density and uniformity in a fired refractory or ceramic product. This desired particle size distribution and packing can be obtained during the initial mixing of the particles as an aqueous slurry. During the course of manufacturing and processing of these slurries, between the initial mixing and firing or freezing which fixes the particles, the particles segregate. Normally the coarse particles settle to the bottom, and when this occurs the green strength of the bodies before firing is considerably diminished. Subsequently, when fired, the particles are fixed in this undesirable distribution producing articles of variable densities, non-uniformity, and reduced strength.

One of the objects of this invention is to mix the different size particles into a slurry with a desired particle distribution, and to treat the particles contained in this slurry so that they remain fixed in the positions originally established by initial mixing throughout the processing steps, so that when the particles are permanently fixed by freezing and/or firing, they are distributed in the desired manner throughout the fired product.

As previously noted, the process is particularly advantageous when utilized in the freeze-cast process. Since the original particle distribution is maintained substantially intact to just prior to freezing, a very fine ice crystal structure results. Also, since the uniform, agglomerated particles resist the growth of ice crystals, a more uniform product having reduced void sizes is produced.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

EXAMPLES

The scope of the invention is further described in connection with the following examples which are set forth for purposes of illustration only and are not to be construed as limiting the scope of the invention in any manner.

EXAMPLE 1

| Grain Size Mesh | Material | Weight Pounds |
| --- | --- | --- |
| −8 +20 | Tabular Alumina | 35.3 |
| −20 +48 | " | 11.5 |

-continued

| Grain Size Mesh | Material | Weight Pounds |
| --- | --- | --- |
| −48 +100 | " | 6.8 |
| −100 +200 | " | 3.0 |
| −200 | " | 11.2 |
| −325 | " | 29.5 |
| −40 | Mullite | 2.7 |
| | | 100.0 |

The dry powders are thoroughly mixed and 13.5 pounds of colloidal silica (Du Pont Ludox SM-30), preblended with 0.68 pounds of 3% solution of polyethyleneimine (Cordova Chemical Co., Corcat P-12), is added to the dry powders under vacuum. The mixture is tumbled for about 8 minutes and then allowed to stand an additional 5 minutes. 0.3 pounds of Du Pont's Lithium Polysilicate 45 is then injected into the mixture and the tumbling continued for 5 minutes or until ready for filling in molds. The molded compositions are then frozen, thawed, and fired in the conventional manner.

EXAMPLE 2

Because of the different nature of the zirconia particles as compared with those of alumina, and in order to achieve the same improvement in slurry properties, it is necessary to adjust the formulation slightly. The following is an example:

| | | |
| --- | --- | --- |
| Graded Zirconia grain | 100 | pounds |
| Colloidal Silica (Du Pont SM-30 Ludox) | 10.5 | preblended |
| 10% Solution of Polyethyleneimine (Corcat P-12) | 0.8 | |
| Du Pont Lithium Polysilicate | 2.0 | |

The same procedure is followed as with the alumina in Example 1 except that the proportions were adjusted. The grain size distribution is substantially the same as for alumina in Example 1.

EXAMPLE 3

24.5 pounds of tabular alumina, mesh size −8 +14 are mixed with 205 grams of a 3 percent solution of polyethyleneimine (Corcat P-12) and tumbled under vacuum for about one minute. 24.4 pounds of −325 mesh tabular alumina are then added and tumbled for about two minutes. A vacuum of about 30" Hg is drawn and tumbling was continued for about eight more minutes. The following graded tabular alumina is then added as a dry powder:

| Mesh Size | Pounds |
| --- | --- |
| −14 +28 | 8.2 |
| −28 +48 | 8.2 |
| −48 +100 | 7.2 |
| −100 +200 | 6.3 |
| −200 | 8.4 | together with 2.4 pounds of −40 mesh mullite. The mixture is tumbled for two minutes under a vacuum of about 30" Hg. Ten pounds of a 30 percent solids colloidal silica sol (Du Pont's SM-30 Ludox) and 0.15 pounds of lithium polysilicate (Du Pont's #48 Lithium Polysilicate) are mixed and added to the above composition while tumbling under vacuum. After about eight more minutes of tumbling, an additional 100 grams of SM-30 Ludox is added to provide final consistency control.

The composition is then injected into molds, frozen, thawed, and fired by known techniques.

It is preferable to treat the coarser grains with the cationic agent, as set forth in Example 3. The reduction in the charge of these coarser grains causes the smaller grains, having the original charge, to stick to or agglomerate around the larger particles, thus preventing segregation of the smaller particles from the larger particles.

With regard to the process set forth in Example 1, wherein the colloidal silica particles are treated with the cationic agent, the treated Ludox particles of a lesser negative charge are able to penetrate within the interstices of the larger particles, and they coagulate with the smaller grain particles, thus achieving the same result as is achieved with the process according to Example 3, but in a different manner.

When utilizing the process of Example 3, it is advantageous to treat approximately one-third of the total weight of the mix. In accordance with the process of Example 1, the weight percentage of particles treated can be considerably less.

Although the time for treatment with the cationic agent is specifically given in the Examples, this time may vary and should simply be that amount of time to permit substantially complete sorption of the cationic agent onto a portion of the particles so that when it is mixed with the untreated portion of the composition, the cationic agent does not sorb onto all of the particles. If all of the particles are treated with the cationic agent, the composition will be thin and the particles will settle.

Although most inorganic particles are negatively charged, such as the alumina and zirconia set forth in the examples, some particles, such as iron oxide, are positively charged. The invention is also applicable to the production of stable particle slurries of positively charged inorganic particles and, in this case, a portion of the particles are treated with an anionic agent to reduce the positive charge in the same manner as set forth above with respect to the negatively charged particles. Examples of some anionic agents which can be used to treat positively charged particles would include the sodium salt of sulfonated naphthalene-formaldehyde condensates marketed by Diamond Shamrock Corporation under the name Lomar D; and the sodium salt of sulfonated melamine-formaldehyde condensates marketed by Suddeutsch Kalkstrikkstoff-Werke, under the name Melment. Any other anionic agent known in the art can also be used so long as it is compatible in the system being used.

Having thus described our invention, what I claim as new and desire to secure by Letters Patent is:

1. An aqueous inorganic particle slurry containing particles of substantially the same charge potential in which a sufficient number of the particles have had the charge potential made opposite by addition of cationic or anionic particles to negatively or positively charged particle slurries, respectively, to a sufficient extent to prevent segregation or settling of the particles on standing and to impart a flowable cream-like thixotropic consistency to the composition.

2. The method of forming a stable aqueous slurry of negatively charged inorganic particles which comprises treating a portion of the particles being used to form the slurry with a cationic agent to reduce the charge of the particles, and mixing the treated portion of the particles with the remainder of the particles being used to form the slurry, the amount of particles treated and the amount of cationic agent used being such that when the treated portion of the particles is mixed with the untreated portion, a thick cream-like flowable composition of a thixotropic nature results.

3. The method of forming a stable aqueous slurry of positively charged inorganic particles which comprises treating a portion of the particles being used to form the slurry with an anionic agent to reduce the charge of the particles, and mixing the treated portion of the particles with the remainder of the particles being used to form the slurry, the amount of particles treated and the amount of anionic agent used being such that when the treated portion of the particles is mixed with the untreated portion, a thick cream-like flowable composition of a thixotropic nature results.

4. The slurry of claim 1 wherein the particles are alumina, silica, magnesia, chromite, spinels, kyanite, carbomul, zirconia, mica, carbon, molybdenum disulfide, uranium oxide, thoria, titania, clays, or mixtures thereof and the charge potential of the particles is negative.

5. The slurry of claim 4 wherein the negative charge potential of the particles is made opposite by the addition of a cationic agent.

6. The slurry of claim 5 wherein the cationic agent is a polyethyleneimine, polyvinyl benzo trimethyl ammonium chloride, a dicyanodiamine-formaldehyde condensate (hydrochloride), a cationic colloidal silica, or mixtures thereof.

7. The slurry of claim 1 wherein the particles are iron oxide and the charge potential of the particles is positive.

8. The slurry of claim 7 wherein the positive charge potential of the particles is made opposite by the addition of an anionic agent.

9. The slurry of claim 8 wherein the anionic agent is a sodium salt of a sulfonated naphthalene-formaldehyde condensate, a sodium salt of a sulfonated melamine-formaldehyde condensate, or mixtures thereof.

10. The method of claim 2 wherein the particles are alumina, silica, magnesia, chromite, spinels, kyanite, carbomul, zirconia, mica, carbon, molybdenum disulfide, uranium oxide, thoria, titania, clays, or mixtures thereof and the charge potential of the particles is negative.

11. The method of claim 10 wherein the cationic agent is a polyethyleneimine, polyvinyl benzo trimethyl ammonium chloride, a dicyanodiamine-formaldehyde condensate (hydrochloride), a cationic colloidal silica, or mixtures thereof.

12. The method of claim 3 wherein the particles are iron oxide and the charge potential of the particles is positive.

13. The method of claim 12 wherein the anionic agent is a sodium salt of a sulfonated naphthalene-formaldehyde condensate, a sodium salt of a sulfonated melamine-formaldehyde condensate, or mixtures thereof.

14. An aqueous slurry comprising inorganic particles having a charge potential, water, and additional inorganic particles having an opposite charge potential than the other inorganic particles to prevent segregation or settling of the particles after preparing and mixing the slurry.

15. The slurry of claim 14 wherein the particles are alumina, silica, magnesia, chromite, spinels, kyanite, carbomul, zirconia, mica, carbon, molybdenum disulfide, uranium oxide, thoria, titania, clays, or mixtures thereof and the charge potential of the particles is negative.

16. The slurry of claim 15 wherein the negative charge potential of the particles is made opposite by the addition of a cationic agent.

17. The slurry of claim 16 wherein the cationic agent is a polyethyleneimine, polyvinyl benzo trimethyl ammonium chloride, a dicyanodiamine-formaldehyde condensate (hydrochloride), a cationic colloidal silica, or mixtures thereof.

18. The slurry of claim 14 wherein the particles are iron oxide and the charge potential of the particles is positive.

19. The slurry of claim 18 wherein the positive charge potential of the particles is made opposite by the addition of an anionic agent.

20. The slurry of claim 19 wherein the anionic agent is a sodium salt of a sulfonated naphthalene-formaldehyde condensate, a sodium salt of a sulfonated melamine-formaldehyde condensate, or mixtures thereof.

* * * * *